United States Patent [19]
Norman et al.

[11] 3,816,019

[45] June 11, 1974

[54] CAM TYPE AIR CONTROL VALVES

[75] Inventors: George J. Norman, Garrett Park; Kenneth R. Reader, Monrovia, both of Md.

[73] Assignee: The United States of America as represented by the Secretary of the Navy, Washington, D.C.

[22] Filed: Aug. 24, 1972

[21] Appl. No.: 283,595

[52] U.S. Cl. .................................. 416/20, 416/90
[51] Int. Cl.... B64c 15/02, B64c 11/24, B64c 11/02
[58] Field of Search.................... 416/114, 90 A, 20; 137/624.17

[56] References Cited
UNITED STATES PATENTS
3,547,317  12/1970  Frey....................................... 416/91

Primary Examiner—Everette A. Powell, Jr.
Assistant Examiner—Louis J. Casaregola
Attorney, Agent, or Firm—R. S. Sciascia; Q. E. Hodges

[57] ABSTRACT

A valve for controlling air flow having a hub adapted to form a plenum therein for maintaining air fed thereinto. At least one nozzle is mounted within the hub for providing a flow path to conduct air from the plenum. Means are mounted within the hub to establish with the nozzles a condition of relative revolving motion and for establishing a quantity of steady air flow through each nozzle and at least one cyclic flow pattern of air through each nozzle. The means within the hub being axially and azimuthally positionable with respect to the nozzles while the condition of relative revolving motion exists.

5 Claims, 22 Drawing Figures

3,816,019

CAM TYPE AIR CONTROL VALVES

The invention described herein may be manufactured and used by or for the Government of the United States of America for Governmental purposes without the payment of any royalties thereon or therefor.

BACKGROUND OF THE INVENTION

This invention relates generally to motors of the fluid current type and specifically those with fluid intake or discharging means on the impeller.

DESCRIPTION OF THE PRIOR ART

In the prior art, one approach to providing cyclic and collective air control valves has been to position the valves in the non-rotating part of the hub. The air mass is generally fed through a system of segmental passages each containing a slide valve. Dual ports are provided in the base of a rotor head which rotates concentrically about the passages. Each port uncovers several of the passages and the air flow entering a blade is dependent upon the valve opening within these segments. Disadvantageously, this system is mechanically complex and is unable to include higher harmonic control unless a sophisticated electronmechanical servo system is added.

Another approach incorporates two separate air supplies controlling the air on the advancing and retreating sectors of the rotor disc. Also, such a system usually provides two separate plenum chambers which supply air to the leading and trailing edge slots respectively. Inclusion of higher harmonic control for this system would be nearly impossible unless some differential higher order air modulation system could be created.

Higher harmonic control capability is advantageous due to the fact that this capability inherently results in reduced power requirements through redistribution of lift on the rotor blades and a reduction in the vibration level of the rotors.

SUMMARY OF THE INVENTION

Accordingly, the present invention may provide an air valve for regulating the supply of air to a set of ventilated helicopter rotor blades through various cams and air nozzles. Thus, the cam type air control valve is essentially comprised of nozzles rotating around a stationary cam or cams. As a result, higher harmonic control capability is practicable without the need for complex mechanical hub systems or sophisticated electromechanical servo systems. Also, it should be noted that increasing the number of blades does not necessarily increase its mechanical complexity.

According to this invention, simultaneously established quantities of steady and cyclic air per each revolution of the hub are provided to blades connected to the revolvable hub. The cyclic flow pattern may include first and second harmonic air or more, depending upon the number of cams used and their configuration. Both the established quantity of steady air flow and the cyclic flow pattern may be varied.

This is accomplished by providing in the rotor assembly a revolvable hub adapted to form a plenum therein for maintaining air fed thereinto and further adapted for connecting a plurality of blades thereto. At least one nozzle is provided to correspond to each blade connection for providing a flow path to conduct air from the plenum to each blade. At least one cam is provided within the plenum for simultaneously establishing a quantity of steady air flow through each nozzle and a cyclic flow pattern of air through each nozzle per each revolution of the hub.

OBJECTS OF THE INVENTION

It is therefore an object of this invention to control the flow of air to a ventilated helicopter blade;

It is also an object of this invention to establish a quantity of steady air flow to each blade;

It is another object of this invention to simultaneously establish with the steady air flow, a cyclic flow pattern of air to each blade per each revolution of the hub;

It is still another object of this invention to vary both the steady and cyclic air flow to the blades;

Other objects, advantages and novel features of the invention will become apparent from the following detailed description when considered in conjunction with the accompanying drawings wherein:

It is to be expressly understood that the above-mentioned drawings are for the purpose of illustration only to aid in the understanding of the invention and are not intended to limit the scope of the present invention.

DESCRIPTION OF THE PREFERRED EMBODIMENT

Figure 1:
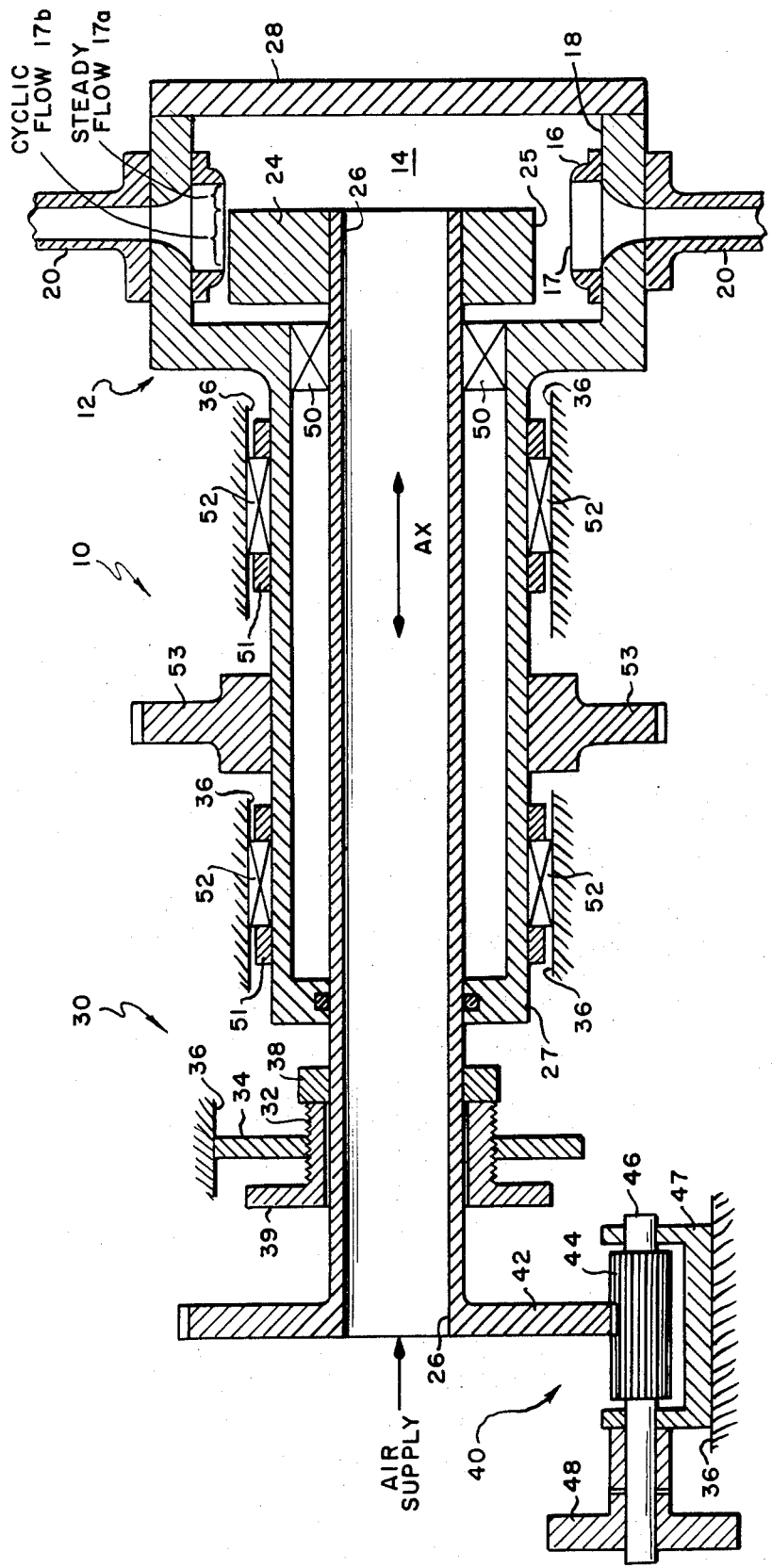
FIG. 1 is a view in cross section of a single cam configuration of the present invention.

Referring now to the drawings, FIG. 1 illustrates a rotor assembly generally designated 10, provided for a two bladed rotor configuration. Rotor assembly 10 includes revolvable hub 12 which forms a plenum 14 therein for maintaining air fed thereinto preferably via camshaft 26 from a suitable air supply, not shown. Hub 12 may be adapted for connecting a plurality of blades thereto. In FIG. 1, hub 12 is adapted for two blades for use with a cam having a frequency of one cycle per revolution. Such a cam includes a single lobe and produces a fundamental frequency. As will be later discussed, a four bladed hub will use a single and a double lobed cam to produce the fundamental frequency and the second harmonic thereof.

Nozzles 16 are rigidly attached to the inside surface 18 of the hub and correspond in number to the number of blades 20 so as to provide a flow path to conduct air from the plenum to each blade. The nozzle entrance openings 17 are all equidistant from the center of rotation of hub 12. The blades 20 are attached to the outside surface of the hub.

Cam 24 is rigidly attached to first harmonic camshaft 26. By means of cam 24 within plenum 14, there may be established a quantity of steady air flow through each nozzle 16 and simultaneously by the same means there may be established a cyclic flow pattern of air through each nozzle 16 per each revolution of hub 12 which revolves about camshaft 26 as permitted by bearing 50.

Hub 12 is revolved due to its rigid connection to drive shaft 27 driven by a suitable power source (not shown) acting through rotor shaft drive gear 53. Rotor hub cover plate 28 is attached to hub 12 preferably by bolts or the like. The axis about which hub 12 revolves is coaxial with the longitudinal axis of camshaft 26.

Cam 24 is positionable with respect to nozzles 16. Due to the cam's axial positioning assembly, later discussed in greater detail, cam 24 is positionable in the axial direction of the longitudinal axis of camshaft 26 for axially varying the position of cam 24 relative to a fixed reference such as airframe 36. Such axial positioning occurs in the directions indicated by the arrow designated AX, see FIG. 1. The cam axial positioning assembly generally designated 30, comprises threaded sleeve 32 engaging threaded collar 34 which is rigidly attached to a portion of the airframe 36. Thrust collar 38 is rigidly attached to camshaft 26. Adjusting wheel 39 may be either manually or power operated to axially adjust camshaft 26 along its longitudinal axis with respect to airframe 36. As a result, cam 24 due to its rigid connection to camshaft 26, is similarly axially adjusted.

Thrust collars 51 are rigidly mounted to rotor shaft 27 which is mounted to airframe 36 by bearings 52 thus permitting the shaft to be revolved with respect to the airframe. However, thrust collars 51 limit axial movement of shaft 27 with respect to the airframe. In this manner, there is provided, relative axial motion between cam 24 and hub 12. Thus, a portion 17a of nozzle entrance opening 17 is directly exposed to plenum 14 to regulate steady air from the plenum as shown in FIG. 1. Portion 17a may be increased or decreased by such axial adjustment which allows varying the quantity of steady air flow through the nozzles. The remaining portion 17b of nozzle opening 17 is exposed to edge portion 25 of cam 24 to regulate the varying quantity of cyclic air from plenum 14. Portion 17b may also be increased or decreased by such axial adjustment.

Figure 2:
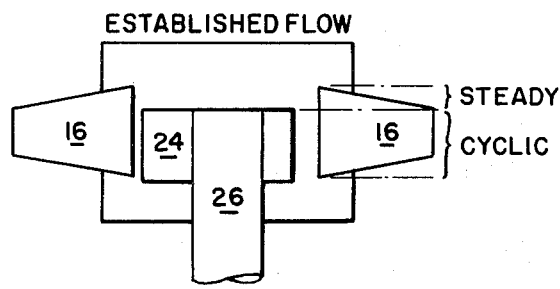
FIG. 2 is a graphic illustration of the relative axial positions of the cam and nozzles of FIG. 1.
Figure 2A:
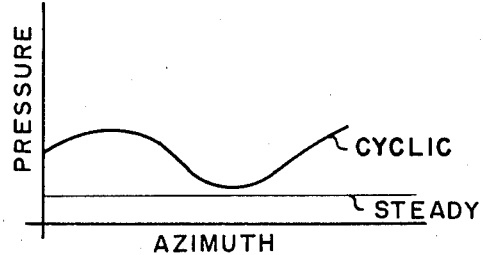
FIG. 2A is a graphic illustration of the flow established by the cam of FIG. 2.
Figure 3:
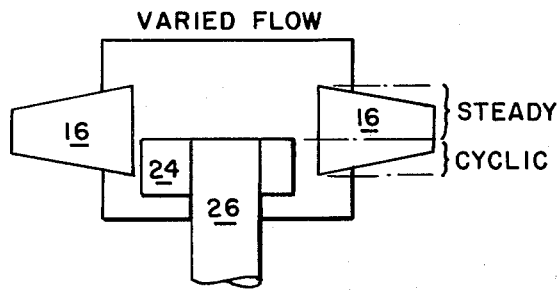
FIG. 3 is a graphic illustration of a varied relative axial position of the cam and nozzles of FIG. 2.
Figure 3A:
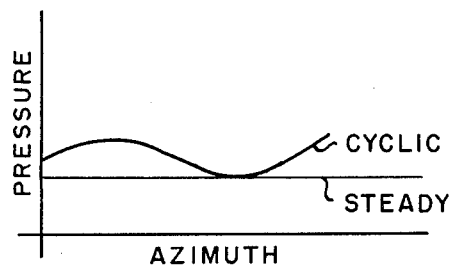
FIG. 3A is a graphic illustration of the varied flow due to the position of the cam of FIG. 3.

Refer now to the drawings wherein it is graphically illustrated in FIGS. 2 and 3 how axially varying the position of cam 24 may vary the established steady and cyclic flow through the nozzles. FIG. 2 illustrates an established position of cam 24 relative to nozzles 16 and FIG. 2A illustrates the corresponding steady and cyclic flow. FIG. 3 illustrates cam 24 varied in position from that shown in FIG. 2. Similarly, FIG. 3A illustrates that in this instance the quantity of corresponding steady and cyclic flow are varied so that the varied steady flow is increased from the established steady flow and the varied cyclic flow is decreased from the established cyclic flow. It is to be recognized however that more accurately stated, the total steady air through nozzle 16 includes a relatively small quantity of steady air which flows from plenum 14 past peripheral portion 25 since there is always some minimum clearance between the peripheral portion and nozzle opening 17. This minimum clearance therefore contributes to the total steady flow since that clearance is substantially unaffected by the cyclic flow.

Again in FIG. 1, due to the azimuth positioning assembly 40, cam 24 is also azimuthally positionable about the longitudinal axis of the camshaft 26 relative to the fixed reference airframe 36. Such azimuthal positioning occurs in the directions indicated by the arrow designated AZ, see FIGS. 4 and 5. Assembly 40 thus permits varying the phasing of the established cyclic flow pattern through the nozzles per each revolution of hub 12. The azimuth positioning assembly 40 comprises spur gear 42 rigidly attached to camshaft 26. Spur gear pinion 44 is meshed with gear 42. Pinion shaft 46 is rigidly attached to pinion 44 and mounted in bearing block 47. Block 47 is rigidly attached to airframe 36. Actuating wheel 48 is rigidly attached to shaft 46 and may be turned either manually or by other power means to adjust the azimuthal position of camshaft 26 about its longitudinal axis. As a result, cam 24 due to its rigid connection to camshaft 26, is similarly azimuthally adjusted. Thus, the portion 17b of the nozzle entrance opening 17 which is directly exposed to edge portion 25 of cam 24, as shown in FIG. 1, may be exposed to a variation in the phasing of the cyclic flow pattern of air through the nozzles which pattern was established by the initial exposure due to the eccentric nature of the cam.

Steady and cyclic air flow may be established by fixing the cam position with respect to the fixed reference, i.e., airframe 36. However as has been described, adjusting the cam with respect to its fixed position, permits variations in the established steady and cyclic air flow to be achieved. Axial adjustment of cam 24 varies the steady and cyclic flow of air into nozzle 16 which is axially fixed relative to the air-frame. By now referring to FIGS. 1, 4 and 5, it can more readily be illustrated as to how azimuthal adjustment of cam 24, in either direction as indicated by line AZ, varies the phasing of the cyclic flow air into nozzle 16.

Figure 4:
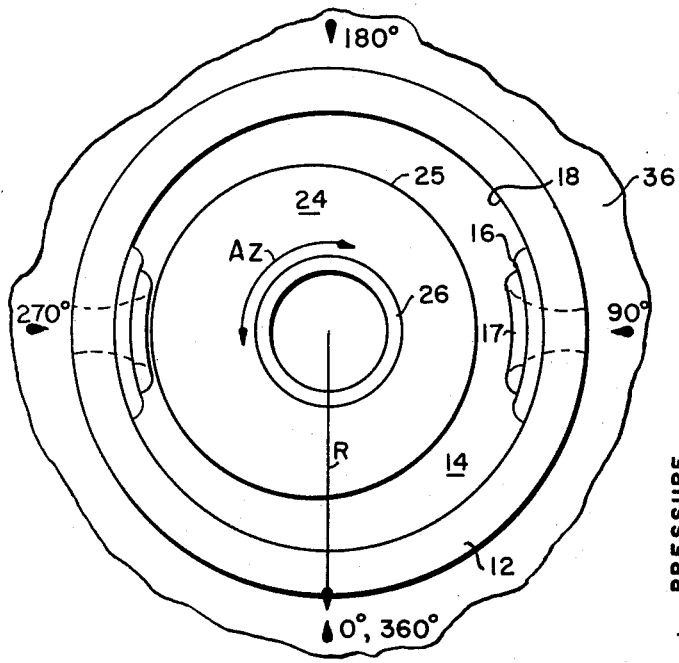
FIG. 4 is a graphic illustration of the relative azimuthal position of the cam and nozzles of FIG. 1.
Figure 4A:
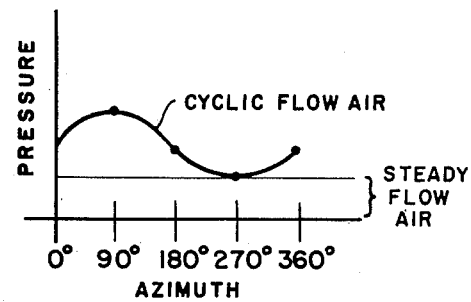
FIG. 4A is a graphic illustration of the flow established by the cam of FIG. 4.

A cyclic flow air pattern is established by fixing the position of the single lobe cam 24 with respect to the fixed reference airframe 36. Thus an established cycle of air flows from plenum 14 into portion 17b of the nozzle openings 17 as hub 12 revolves about cam 24. As shown in FIG. 4, cam 24 has a fixed reference to airframe 36 indicated by the line R aligned with a fixed reference designated as 0°. In this position, as hub 12 rotates about single lobe cam 24, air flowing from plenum 14 through portion 17b of nozzle opening 17 establishes a cyclic flow pattern. This cyclic flow may be expressed graphically by the sine wave illustrated at FIG. 4A. When a pre-set air pressure is maintained in the system, steady air flow passes through nozzle portion 17a and is also illustrated in FIG. 4A. As previously discussed, axial adjustment of cam 24 relative to nozzle 16 will accordingly raise or lower the line of steady flow air above or below that line shown in FIGS. 4A and 5A. In addition to the steady flow air, the cyclic flow air varies according to the eccentricity of cam 24 with respect to the fixed reference points, 0°, 90°, 180° and 270° as nozzles 16 rotate with hub 12. By coordinating FIGS. 4 and 4A it may be observed that this established cyclic flow pattern will remain substantially periodic since both cam 24 and airframe 36 have substantially no relative motion.

Figure 5:
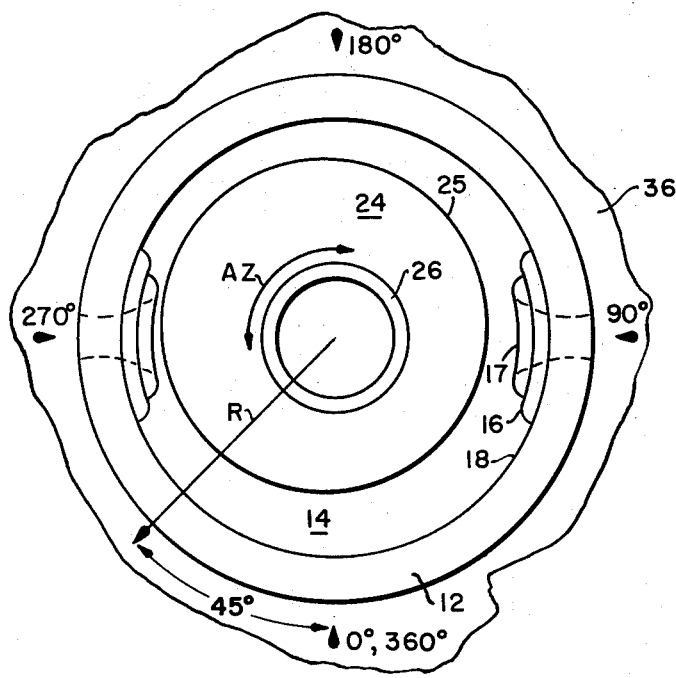
FIG. 5 is a graphic illustration of a varied relative azimuthal position of the cam and nozzles of FIG. 4.
Figure 5A:
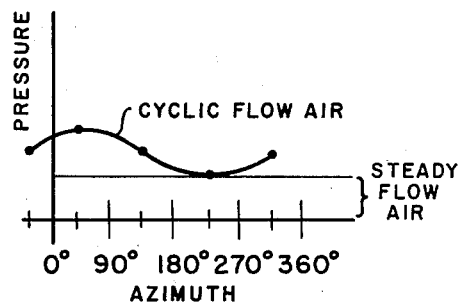
FIG. 5A is a graphic illustration of the varied flow due to the position of the cam of FIG. 5.

When it is desired to vary the phasing of the established flow pattern by a given angular adjustment to cam 24, for example 45°, FIGS. 5 and 5A illustrate the resultant effect on the established flow pattern. That is, the sine wave of FIG. 5A is shifted by a corresponding 45° out of phase with the established flow pattern shown in FIG. 4A. It can be seen that by azimuthally positioning cam 24 relative to fixed reference 36, the phasing of the established cyclic flow pattern may be varied.

Figure 6:
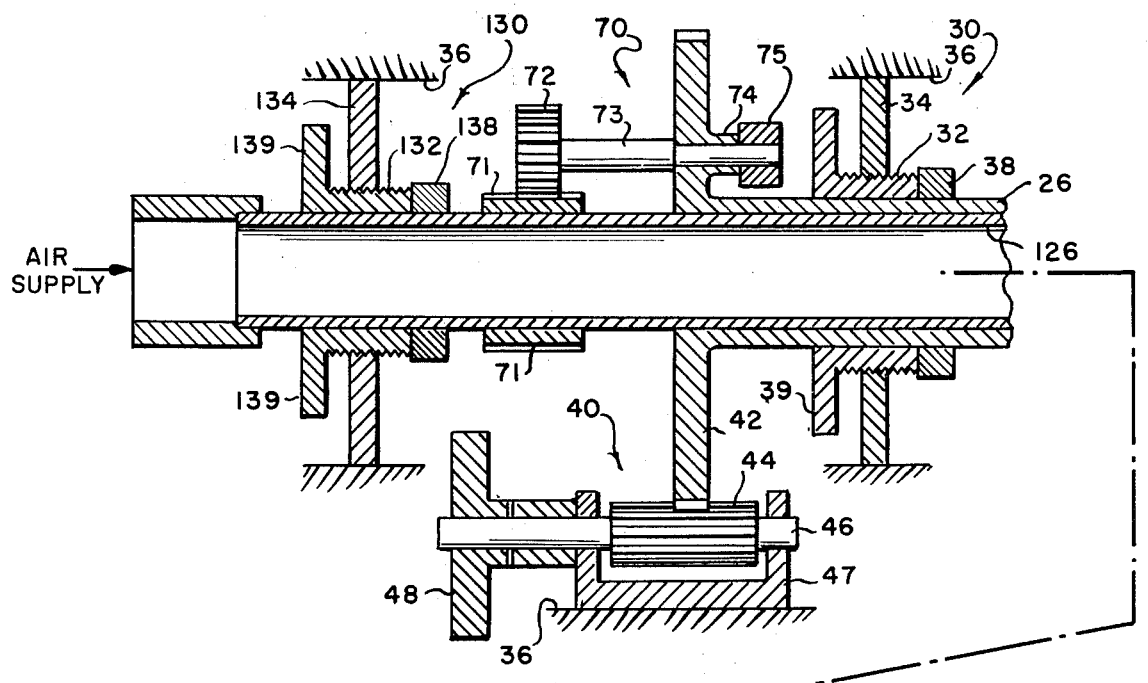
FIG. 6 is a view in cross section of the two cam configuration of the present invention.
Figure 6:
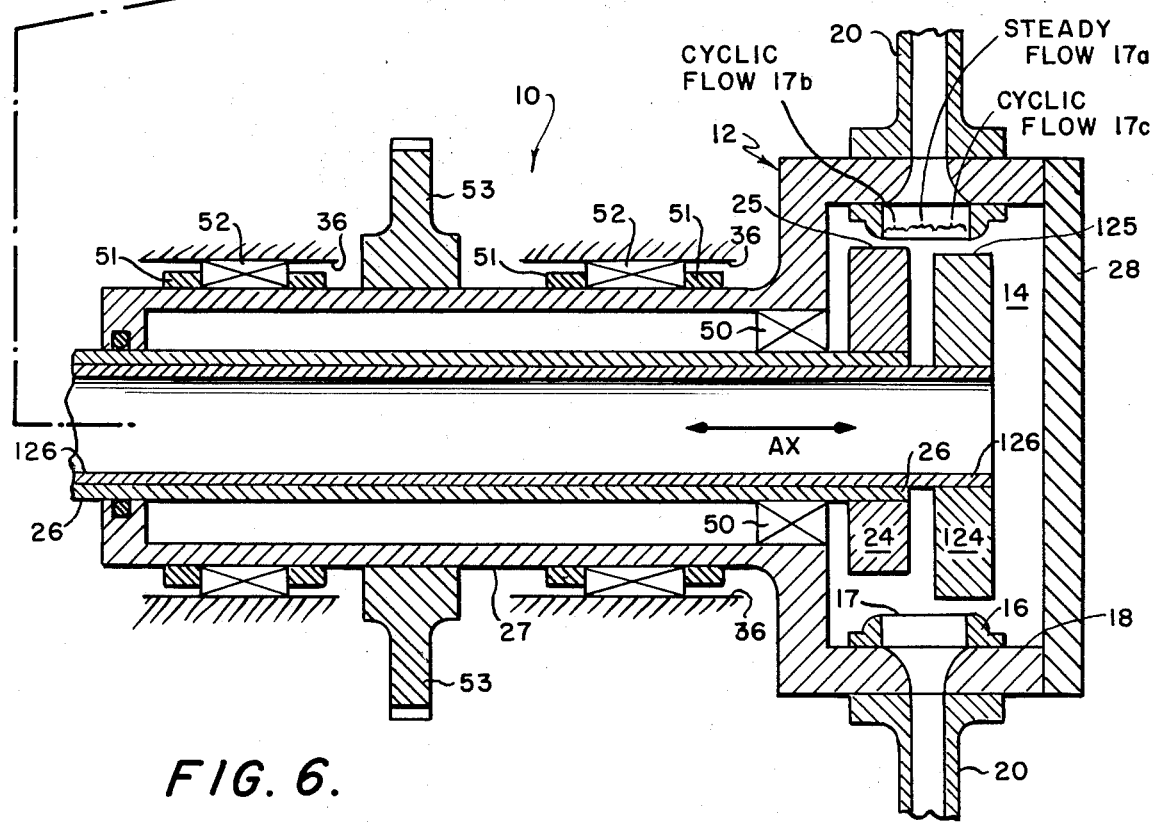

Refer now to FIG. 6 wherein it is illustrated that the rotor assembly of FIG. 1 may include first and second cams 24 and 124 respectively. Cams 24 and 124 are each rigidly connected to their respective concentric camshafts 26 and 126. Both cams are positionable with respect to nozzles 16 and more specifically, cams 24 and 124 are positionable either independently of each other or together as a unit.

As previously described for cam 24, cam 124 is similarly positionable with respect to nozzles 16 due to the cam's axial positioning assembly designated 130. Thus cam 124 is axially positionable along the axis of camshaft 126 for axially varying the position of cam 24 relative to a fixed reference such as airframe 36. Such axial positioning also occurs in the directions indicated by the arrow designated AX in FIG. 6. Cam axial positioning assembly 130 comprises threaded sleeve 132 engaging threaded collar 134 which is rigidly attached to a portion of the airframe 36. Thrust collar 138 is rigidly attached to camshaft 126. Adjusting wheel 139 may be either manually or power operated to axially adjust camshaft 126 along its longitudinal axis with respect to airframe 36. As a result, cam 124 due to its rigid connection to camshaft 126 is similarly axially adjusted.

By simultaneously and uniformly operating adjusting wheels 39 and 139, first and second cams 24 and 124 may be caused to be axially positioned in unison along the axis of their respective camshafts 26 and 126. In this manner, the axial position of both cams is varied relative to the fixed reference airframe 36 and the established quantity of cyclic air flow through nozzles 16 is varied.

This may be further illustrated by referring to FIGS. 6, 7, 7A, 8 and 8A. In FIG. 6 cams 24 and 124 have respective peripheral portions 25 and 125 exposed to portions 17b and 17c of nozzle opening 17. The remaining nozzle portion 17a is directly exposed to plenum 14 to regulate the steady flow of air.

Figure 7:
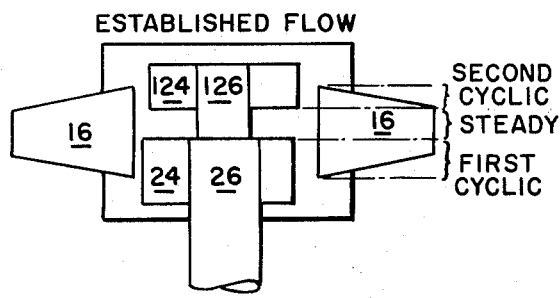
FIG. 7 is a graphic illustration of the relative axial positions of the cams and nozzles of FIG. 6.
Figure 7A:
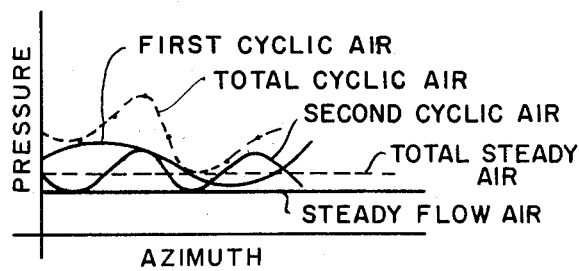
FIG. 7A is a graphic illustration of the flow established by the cams of FIG. 7.
Figure 8:
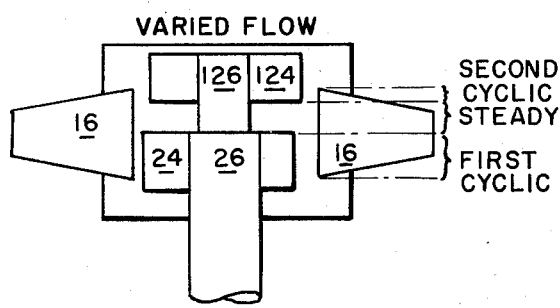
FIG. 8 is a graphic illustration of a varied relative axial position of the cams and nozzles of FIG. 7.
Figure 8A:
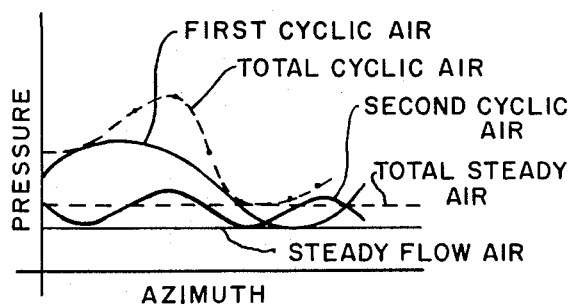
FIG. 8A is a graphic illustration of the varied flow due to the position of the cams of FIG. 8.

By referring to FIGS. 6, 7 and 7A for example, it may be seen that the quantity of steady flow air through nozzle 16 is mostly dependent upon the size of nozzle portion 17a. That quantity of steady air is graphically shown in FIG. 7A. The quantities of first and second cyclic air through nozzle 16 are dependent upon the size of nozzle portions 17b and 17c respectively. Those quantities of cyclic air are also graphically shown in FIG. 7A. Further shown in FIG. 7A are the total steady and cyclic air through nozzle 16. It is to be recognized however as stated before, that the total steady air through nozzle 16 includes a relatively small quantity of steady air which flows from plenum 14 past peripheral portions 25 and 125 since there is always some minimum clearance between those peripheral portions and nozzle opening 17. This minimum clearance therefore contributes to the total steady flow since that clearance is substantially unaffected by the cyclic flow.

As established flow of steady and cyclic air may be graphically illustrated by referring to FIGS. 7 and 7A. By axially positioning cams 24 and 124 in unison, FIG. 8, the established steady and cyclic air flow may be varied, see FIG. 8A. That is, the cyclic flow due to second cam 124 is decreased and the cyclic flow due to first cam 24 is increased as compared to the established cyclic flow of FIG. 7. Axial positioning of cams 24 and 124 as a unit provides no substantial change in the relative position of the cams and the steady flow changes only slightly.

Figure 9A:
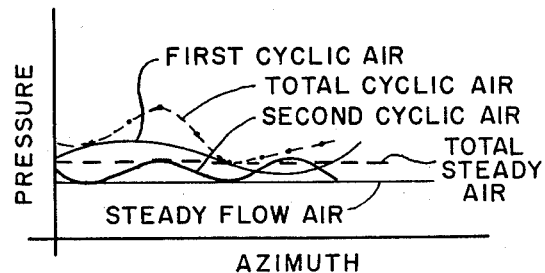
FIG. 9A is a graphic illustration of the varied flow due to the position of the cams of FIG. 9.
Figure 9:
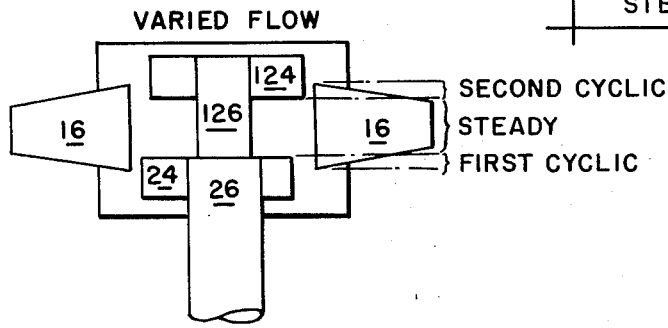
FIG. 9 is a graphic illustration of another varied relative axial position of the cams and nozzles of FIG. 7.

First and second cams 24 and 124 respectively are independently axially positionable along the axes of their respective camshafts 26 and 126 by independently adjusting wheels 39 and 139. That is, cam 24 may be adjusted while cam 124 is held stationary or vice versa, or, cams 24 and 124 may be simultaneously adjusted to varying degrees. In this manner, cams 24 and 124 are adjusted relative to each other for varying both the steady and cyclic air flow from the established flow. The established steady and cyclic air flow as illustrated in FIGS. 7 and 7A may be varied to the positions illustrated in FIGS. 9 and 9A wherein is shown, for example, that both the first and second cyclic air flow have been decreased and the steady air flow has been increased.

First and second cams 24 and 124 are azimuthally positionable in unison about the axes of concentric camshafts 26 and 126 for azimuthally varying the position of the cams relative to the airframe 36. As a result, the phasing of an established cyclic flow pattern may be varied.

Previously, it was illustrated that a one frequency per revolution, or single lobe cam, could be provided within hub 12 to establish a cyclic flow pattern as the nozzles 16 revolved thereabout, see FIGS. 4 and 4A. It was also shown that by azimuthally positioning cam 24 with respect to airframe 36, the established cyclic flow pattern could be varied, see FIGS. 5 and 5A. By now referring to FIGS. 6, 10, 10A, 11, and 11A it may be seen that a hub may have two cams therein, for example a one frequency per revolution cam 24 (single lobe cam) and a two frequency per revolution cam 124 (double lobe cam). In such an instance there may be provided to nozzles 16 a steady flow of air and two different cyclic flow patterns of air.

FIG. 6 illustrates such an instance wherein periphery 125 of cam 124 provides a second cyclic flow of air into nozzle portion 17C. A steady flow of air is provided to nozzle portion 17a.

Figure 10:
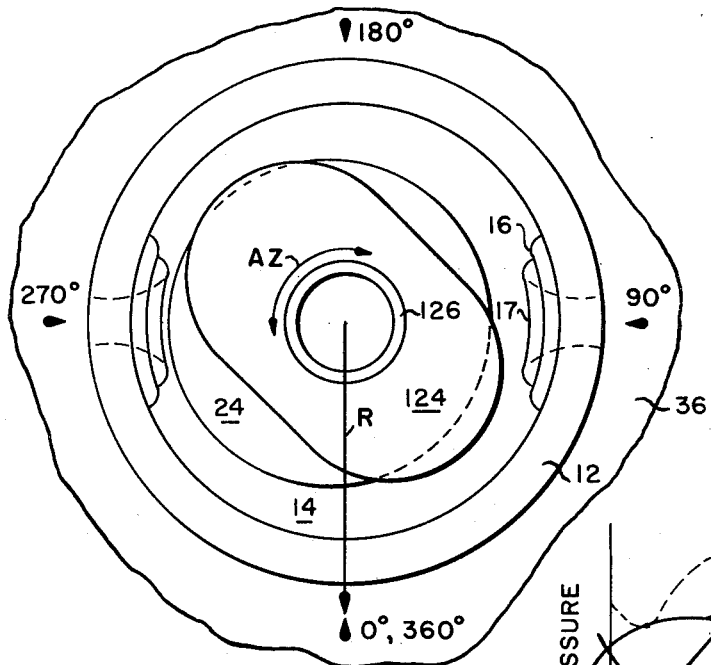
FIG. 10 is a graphic illustration of the azimuthal position of the cams and nozzles of FIG. 6.
Figure 10A:
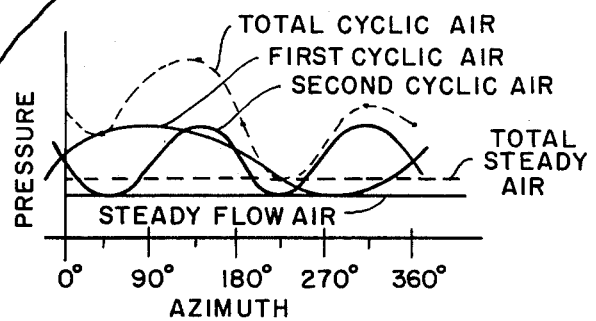
FIG. 10A is a graphic illustration of the flow established by the cams of FIG. 10.

An established flow of air comprising a first cyclic, a second cyclic and a steady flow are illustrated in FIGS. 10 and 10A wherein it can be seen that first cam 24 and second cam 124 are provided within hub 12 in position to establish first and second cyclic flows of air into nozzles 16. The established airflow is illustrated to relate to the fixed position of cams 24 and 124 with respect to airframe 36 as indicated by the line R aligned with a fixed reference designated 0°. In this position, as hub 12 rotates about cams 24 and 124, air flowing from plenum 14 through nozzle opening 17 establishes the first and second cyclic flow patterns. These cyclic flow patterns may be expressed graphically by the sine waves illustrated and so designated at FIG. 10A. The steady flow air is also illustrated in the figure. Thus when a pre-set air pressure is maintained in the system, a steady air flow passes through nozzle portion 17a simultaneously with the first and second cyclic air flow patterns due to the lobes of cams 24 an 124.

Figure 11:
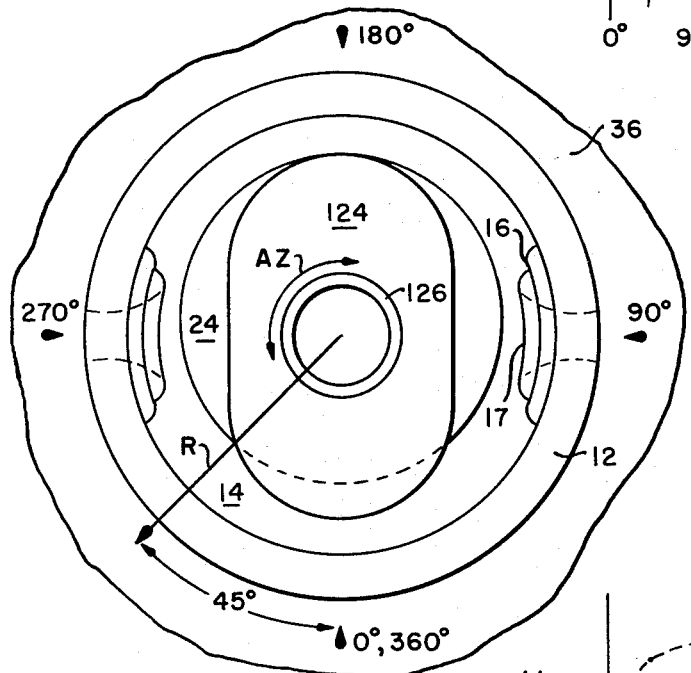
FIG. 11 is a graphic illustration of a varied relative azimuthal position of the cams and nozzles of FIG. 10.
Figure 11A:
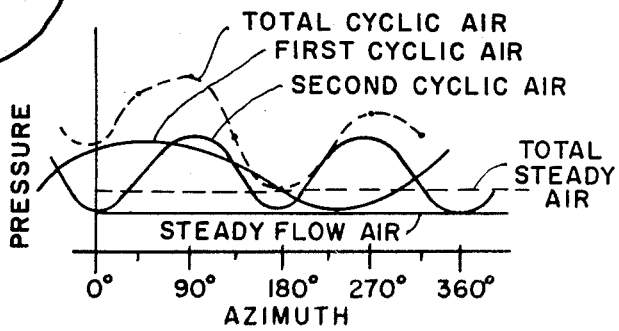
FIG. 11A is a graphic illustration of the varied flow due to the position of the cams of FIG. 11.

When it is desired to vary the phasing of the established flow pattern by a given angular adjustment to cams 24 and 124, for example 45°, FIGS. 11 and 11A illustrate the resultant effect on the established flow pattern. That is, since both cams were rotated by the same amount, the sine waves of FIG. 11A are shifted by a corresponding 45° out of phase from the established flow pattern shown in FIG. 10A. Thus cams 24 and 124 produce certain frequencies per revolution and may be proportioned so that the varying distance between rotating portions 17b, 17c and the relatively stationary cam peripheries 25 and 125, due to their lobed configurations, are sine functions of the angular position of the hub.

The strucutral means for effecting such a unitary phasing of cams 24 and 124 simultaneously may be provided by azimuthal positioning assembly 40 as previously discussed but being modified by interconnecting the shafts 26 and 126 by means of phase angle positioning assembly designated 70. Assembly 70 comprises spur gear 71 rigidly attached to shaft 126. Spur gear pinion 72 meshes with gear 71 and a pinion shaft 73 is rigidly attached to pinion 72 at one end while the other end thereof is mounted in sleeve bearing 74. Actuating ring 75 is rigidly attached to pinion shaft 73. Thus, by turning actuating wheel 48 as previously described, the power produced thereby is transmitted via the azimuthal positioning assembly 40 to the phase angle positioning assembly 70 to adjust cams 24 and 124 in unison without altering the phase angle between them.

Figure 12:
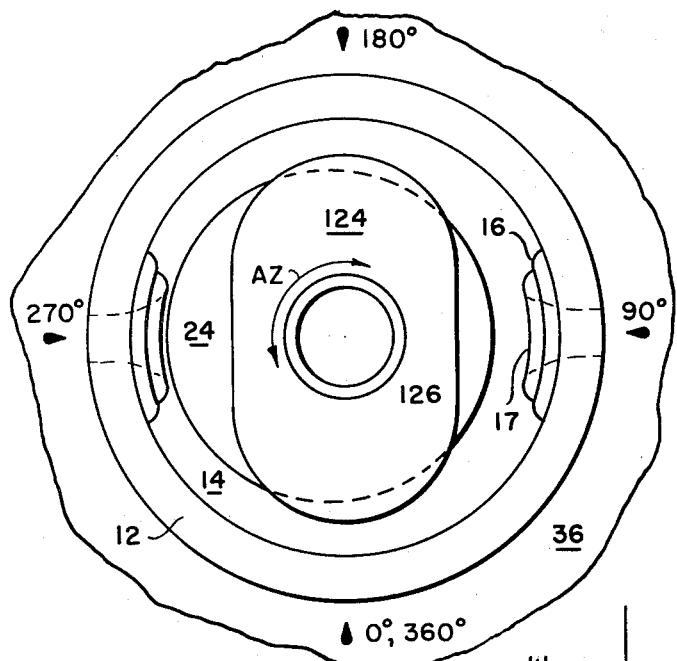
FIG. 12 is a graphic illustration of another varied relative azimuthal position of the cams and nozzles of FIG. 10.
Figure 12A:
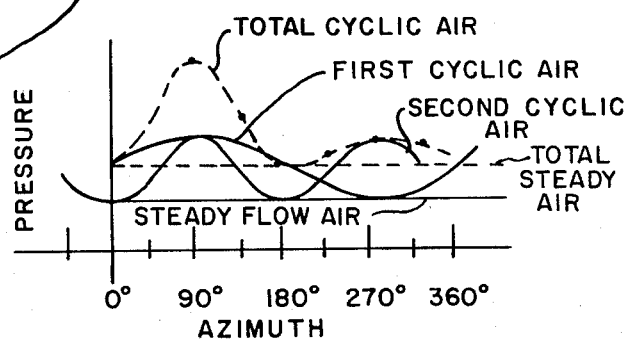
FIG. 12A is a graphic illustration of the flow established by the cams of FIG. 12.

Cams 24 and 124 may be independently azimuthally positioned above the axes of concentric camshafts 26 and 126 for azimuthally varying the position of the cams relative to each other and for varying the phasing of the established cyclic flow pattern of FIGS. 10 and 10A. For example, cam 124 may be positioned independently of cam 24 by rotating actuating ring 75 either manually or by some power source. In this manner, shaft 73 rotates pinion 72 which is meshed to drive gear 71. The rigid attachment of gear 71 to shaft 126 permits the shaft to be azimuthally rotated independently of shaft 26. Thus, with cams 24 and 124 in the established position as illustrated in FIG. 10, adjustment of actuating ring 75 permits shaft 126 to rotate thus also rotating cam 124 to phase that cam independently of cam 24, see FIG. 12. As a result, the second cyclic flow pattern established in FIG. 10A is phased, for example, 45° to the flow pattern of FIG. 12A with the first cyclic flow pattern remaining as previously established. The total effect, or the sum of the first and second cyclic flow patterns is altered from that established in FIG. 10A while the established steady flow air remains relatively constant.

When it is desired to change the azimuthal position of cam 24 independently of cam 124, this may be accomplished as previously described by means of azimuthal positioning assembly 40. However, since the adjusting of azimuthal positioning assembly 40 as shown in FIG. 6 will also simultaneously adjust cam 124 due to the interconnection of shafts 26 and 126 via phase angle positioning assembly 70, an equivalent reversing adjustment provided to actuating ring 75 simultaneously with the adjustment provided to shaft 26, will maintain cam 124 substantially stationary while the azimuthal position of cam 24 is adjusted relative thereto.

It is contemplated that alternative means of accomplishing the axial and azimuthal positioning of cams 24 and 124 may be utilized. Such alternatives, is preferred, could satisfactorily produce the desired result obtained by the means herein illustrated. It is also contemplated that alternate combinations of numbers of cams and nozzles may be used. Also cams of varying configurations may be incorporated without altering the spirit of this invention.

Thus it has been illustrated, according to the foregoing that the present invention disclosed controlled flow of air to ventilated helicopter blades including an established steady air flow simultaneously provided with at least one cyclic flow pattern of air to each blade per each revolution of the hub. Also, both the established steady and cyclic flows of air may be varied.

Obviously many modifications and variations of the present invention are possible in the light of the above teachings. It is therefore to be understood that within the scope of the appended claims the invention may be practiced otherwise than as specifically described.

What is claimed is:

1. In a system for ventilated helicopter rotor blades, a rotor assembly for controlling the air flow into the blades, comprising:

a revolvable hub adapted to form a plenum therein for maintaining air fed thereinto and further adapted for connecting a pluality of blades thereto;

at least one nozzle connected to the hub and corresponding to each blade connection for providing a flow path to conduct air from the plenum to each blade; and means within the plenum for establishing a quantity of steady air flow through each nozzle and at least one cyclic flow pattern of air through each nozzle per each revolution of the hub, said means comprising a first cam and a second cam mounted on independent concentric shafts plus means to selectively position said cams independently of each other or together as a unit.

2. The system of claim 1 wherein said cams are connected to concentric camshafts which are axially positionable in unison along the axes thereof for axially varying the position of the cams relative to a fixed reference and for varying the established quantity of steady and cyclic air flow through the nozzles.

3. The system of claim 2 including means to independently axially position said cams along the axes of the concentric camshafts for axially varying the position of the cams relative to each other and for varying the established quantity of steady and cyclic air flow through the nozzles.

4. The system of claim 3 including means to azimuthally position said cams in unison about the axes of the concentric camshaft for azimuthally varying the position of the cams relative to a fixed reference and for varying the phasing of the established cyclic flow pattern.

5. The system of claim 4 including means to independently azimuthally position said cams about the axes of the concentric camshafts for azimuthally varying the position of the cams relative to each other and for varying the phasing of the established cyclic flow pattern.

* * * * *